United States Patent [19]

Nomura

[11] 4,204,442
[45] May 27, 1980

[54] CUTTER HOLDING DEVICE IN A POLYGON CUTTING APPARATUS

[76] Inventor: Takayuki Nomura, Tanazawa 437, Okutamamachi, Nishitamagun, Tokyo, Japan

[21] Appl. No.: 941,188

[22] Filed: Sep. 11, 1978

[51] Int. Cl.² .............................................. B23B 3/28
[52] U.S. Cl. .................................................... 82/18
[58] Field of Search ................................. 82/1 C, 18

[56] References Cited

U.S. PATENT DOCUMENTS

| | | | |
|---|---|---|---|
| 2,759,306 | 8/1956 | Rhodes | 82/18 |
| 3,442,165 | 5/1969 | Billeter | 82/18 |
| 3,827,318 | 8/1974 | Sorenson | 82/1 C |
| 3,916,738 | 11/1975 | Newbrand | 82/18 |

*Primary Examiner*—Harrison L. Hinson
*Attorney, Agent, or Firm*—Fidelman, Wolffe & Waldron

[57] ABSTRACT

A rotary cutter holding device for use with a polygon cutting apparatus in a movable spindle-type automatic lathe is provided. The cutter holding device utilizes a pair of angular contact ball bearings in conjunction with a belleville spring to carry the thrust load imposed by the cutter.

2 Claims, 4 Drawing Figures

CUTTER HOLDING DEVICE IN A POLYGON CUTTING APPARATUS

DETAILED DESCRIPTION OF THE INVENTION

The present invention relates to a rotary cutter holding device in embodiment of a polygon cutting apparatus into a spindle movable type automatic lathe.

Figure 1:
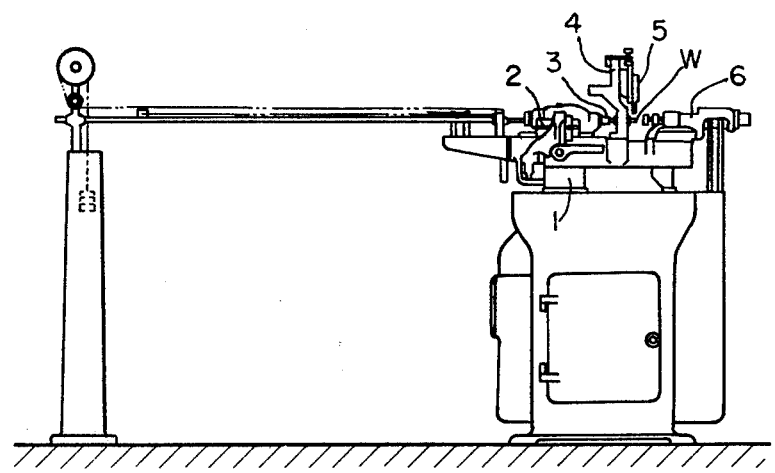
FIG. 1 is a schematic view of a spindle movable type automatic lathe.

The spindle movable type automatic lathe will be explained roughly with reference to FIG. 1. A headstock 2 is axially slidably mounted on a base 1, and a spindle 3 is rotatably mounted on the headstock 2. The spindle 3 interiorly receives at its forward end a collet chuck, which is adapted to grip a work W and can be rotated along with the spindle 3. Forwardly of the spindle 3 there is disposed a tool stand 4 having a guide bushing mounted in a central portion thereof, and several tools 5 are mounted movably in a radial direction of the work W. Further forwardly of the spindle there is disposed an end machining device 6 which machines a work end.

Figure 2:
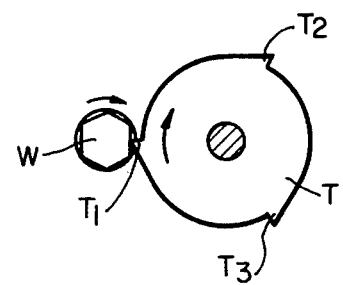
FIG. 2 is a simple view of assistance in explaining the polygon cutting.

In embodiment of the polygon cutting device into such a spindle movable type automatic lathe, a rotary cutter is mounted on one of the tools 5. Some explanation will be first given of the polygon cutting. As shown in FIG. 2, the work W and the cutter T rotate in the same direction, and the rotational speed of the cutter T is the same as or integral times of that of the work W. The cutter T has cutting edges $T_1$, $T_2$, $T_3$ . . . disposed in positions distributed at equal angles in accordance with a desired polygon for polygonal cutting. The embodiment of the polygon cutting device into the spindle movable type automatic lathe is well-known from U.S. Pat. No. 3,827,318 and the like. However, prior art rotary cutter holding devices pose problems which in assembly thereof, require a high level of technique and much time.

Figure 3:
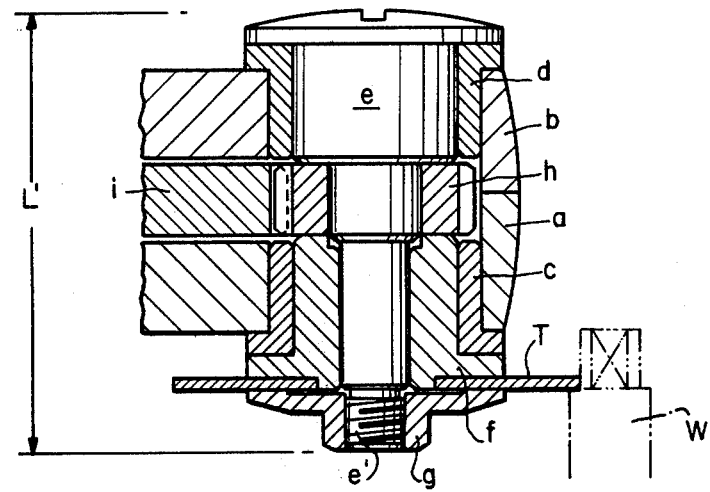
FIG. 3 is a sectional view of a conventional cutter holding device in a polygon cutting apparatus.

These problems will be discussed with reference to FIG. 3. That is, housings a and b have bearings c and d inserted therein to rotatably support a shaft e and a sleeve f thereon. The shaft e has at the foremost end thereof a threaded portion e' with which a nut g is meshed to lock the cutter T to the shaft e and to fasten the bearings c and d to the housings a and b. The reference characters h and i designate driving gears. As previously explained with respect to the outline of the spindle movable type automatic lathe, the end machining device 6 is positioned frontwardly of the tool stand 4 and is located very close to the tool stand 4 so as to enhance the machining efficiency. It is therefore necessary to design the width L' of the rotary cutter holding device as small as possible, and under the existing circumstances, the driving gear h is secured to the shaft e by employment of a method in which the driving gear h is fastened by the shaft e and the sleeve f. Looking at this structure again, the fastening force by means of the shaft e and the nut g must function as the force for fastening the bearings e and d to the housings a and b as well as the force for fastening the shaft e and the sleeve f to the driving gear h, and thus, adjustment in assembly of the device requires an extremely high level of technique and much time. Further, since the bearings c and d are in the form of a plain bearing, replacement thereof due to wear was quite often, resulting in a great loss of time.

The present invention has been achieved in view of these problems noted above. It is an object of the present invention to employ rolling bearings in the holding device instead of plain bearings so as to minimize a frequency of replacement thereof due to wear.

It is another object of the present invention to employ a magazine type holding device so that even when it is replaced, for example, it may be removed easily, so as to minimize a loss of time.

It is a further object of the present invention to exclude difficult adjusting work that has been required when in assembly.

In the following, one embodiment of the present invention will be described in connection with the drawing in order to fully understand other effects resulting from the present invention.

Figure 4:
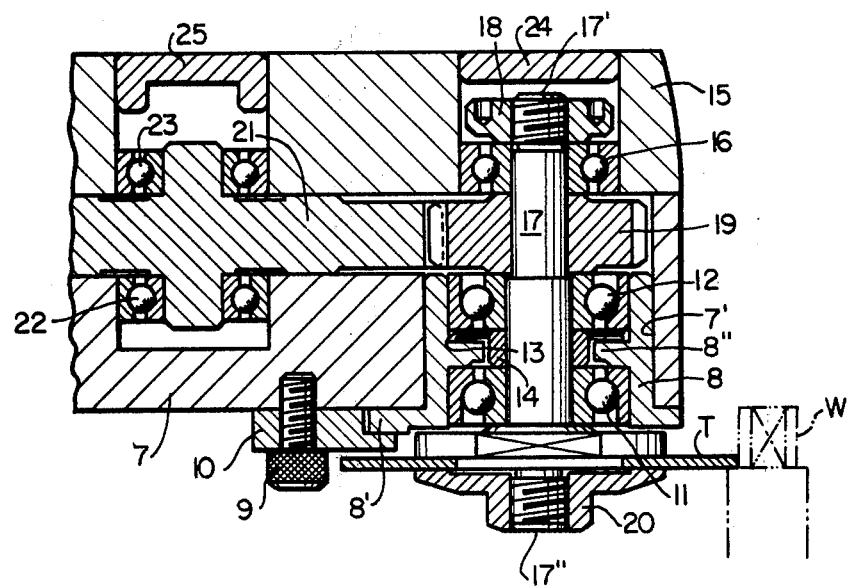
FIG. 4 is a sectional view showing and embodiment of a cutter holding device in accordance with the present invention.

FIG. 4 is a sectional view of a cutter holding device in accordance with the present invention, which is embodied into the foremost end of a polygon cutting apparatus.

A sleeve 8 is inserted into a hole 7' formed in a housing 7, and a flange 8' of the sleeve 8 is firmly fixed by a stopper 10, which is locked by a bolt 9 to the housing 7. There is disposed a set of angular contact ball bearings 11 and 12 with a wall 8'' within the sleeve 8 interposed therebetween, one bearing 12 having an outer ring biased by a resilient force of a belleville spring 13 which bears on the wall 8'' to apply a prepressure, or preload, to the set of angular contact ball bearings. A roller indicated at 14 serves to restrain inner rings of two angular contact ball bearings. On the other hand, there is another housing 15 which accommodates a radial ball bearing 16, and a shaft 17 is rotatably supported on these three ball bearings. The shaft 17 is formed at one end thereof with a threaded portion 17', with which a nut 18 is meshed. The driving gear 19 is fastened by the nut 18 through the inner rings of the three ball bearings and a collar 14 to the shaft 17. A nut 20 is meshed with a threaded portion 17'' formed in the other end of the shaft 17 to secure a cutter T to the shaft 17. A driving gear indicated at 21 is rotatably supported on two radial ball bearings 22 and 23. Reference numerals 24 and 25 designate seals to prevent an outflow of a lubricating oil.

The construction of the cutter holding device in the polygon cutting apparatus in accordance with the present invention has been described, in which the belleville spring and the angular contact ball bearings are used to carry a thrust load applied to the cutter and the shaft whereby it becomes possible to use the rolling bearings instead of the plain bearings so far used to substantially decrease a frequency of replacement thereof due to wear of bearings. Since a magazine system is employed, in which the holding device may be removed together with the sleeve 8 in a simple manner only by removing the bolt 9 and the stopper 10, replacement thereof if needed can be accomplished with a minimal operation in a narrow space between the tool stand 4 and the end machining device 6 as previously described and most operation can be accomplished in a wide space outside the machine to omit a wastage of working time. Furthermore, extremely difficult adjusting work which has been heretofore necessitated is not necessary to simplify assembling work, thereby reducing the operation time.

What is claimed is:

1. A cutter holding device in a polygon cutting apparatus, which is embodied into a spindle movable type automatic lathe, the cutter holding device being characterized in that a shaft with a rotary cutter held thereon is rotatably supported on two angular contact ball bearings mounted on a sleeve removably secured to a first housing and further supported on a third bearing mounted on a second housing, said two angular contact ball bearings being applied with a prepressure or preload by a belleville spring, and a driving gear is fastened to said shaft by a fastening force of a nut meshed with a threaded portion formed on one end of said shaft.

2. The device of claim 1 wherein said third bearing is a radial ball bearing.

* * * * *